Patented Dec. 15, 1931

1,836,530

UNITED STATES PATENT OFFICE

ALFRED FISHER, OF ROSELLE, NEW JERSEY, ASSIGNOR TO WILLIAM G. ATWOOD, TRUSTEE, OF NEW YORK, N. Y.

EMULSIONS SUITABLE FOR WOOD PRESERVATION AND PROCESS OF WOOD PRESERVATION AND PRODUCT THEREOF

No Drawing.   Application filed April 21, 1928.   Serial No. 271,981.

This invention relates to emulsions suitable for wood preservation and to processes of wood preservation and the product thereof.

According to the present invention an emulsion suitable for wood impregnation may be made with clay as a stabilizer, using creosote or other oily material for the disperse phase of the emulsion and an aqueous solution of a suitable salt for the continuous phase. The product is suitable for impregnating wood to preserve it against decay either by the open tank system, or by the pressure systems, either full or empty cell. It is found that the penetration test shows either complete penetration of wood by both the creosote and the solution, or deeper penetration by the solution.

Other features and advantages will hereinafter appear.

*Example 1.*—Ten grams of a California bentonite or colloidal clay were made into a paste with fifty cc. of water by gradual mixing it in by stirring with a stirring rod in a glass beaker until homogenous. To ten cc. of this paste, the equivalent of one gram of clay, was gradually added fifty cc. of No. 1 A. R. E. A. specification creosote oil during agitation with a dover type egg beater. When the mixture was uniform there was slowly added, during continuance of this agitation, fifty cc. of a five per cent zinc chloride solution and the agitation continued until the resulting emulsion was uniform. This emulsion showed no sign of separation even when heated over a boiling water bath for an hour and then allowed to stand for several days.

*Example 2.*—Ten grams of the bentonite paste were similarly mixed with the same agitation, with one hundred cc. of the creosote and one hundred cc. of the solution, and the resulting emulsion was equally stable.

*Example 3.*—Ten grams of a Wyoming bentonite were used in making another paste and emulsion similar to that of Example 1, and an equally stable emulsion was obtained.

*Example 4.*—Ten grams of the latter bentonite were used as the first named in Example 2, and an equally stable emulsion was obtained.

Equally satisfactory results were obtained with a three per cent solution of zinc chloride used in the same procedures, but an inferior emulsion was obtained when the zinc chloride solution was mixed into the aqueous paste of clay before adding the oil. A stable emulsion was obtained when a neutral oil was substituted for the creosote oil.

The same kind of result was obtained when a water solution containing about fifty per cent of zinc chloride was used.

*Example 5.*—The procedures of these examples were repeated with water gas tar instead of creosote, and similar stable emulsions were obtained suitable for the same purposes.

*Example 6.*—The procedures of Examples 1 and 2 were repeated using a five per cent solution of sodium fluoride instead of zinc chloride with parallel results.

*Example 7.*—The procedures of Examples 1 and 2 were repeated using a five per cent solution of mercuric chloride instead of zinc chloride with parallel results.

When a drop of one of the foregoing stable emulsions is allowed to fall on blotting paper, a small circle is filled with creosote, and this is surrounded by a larger annular ring of paper wet with aqueous solution.

A piece of yellow pine one inch by two inches by three inches was immersed in the emulsion of Example 1, and heated for two hours over a boiling water bath, viz. to about 180° F. The wood was then removed and found to be saturated throughout with the solution and with creosote. A similar piece of yellow pine, but twice as long, immersed half its length, and similarly heated in the emulsion, was found to be saturated where immersed and partly saturated above, the zinc chloride solution having saturated it higher up than the creosote. In each case clay appeared to be deposited in the interstices.

Having thus described certain embodiments of my invention, what I claim is:

1. The process of making an emulsion of creosote and an aqueous solution which consists in wetting a colloidal clay with water, mixing the resulting paste with the creosote, and mixing the creosote-containing mixture with the aqueous solution.

2. The process of making an emulsion of creosote and an aqueous solution of a metallic salt which consists in wetting a colloidal clay with water, mixing the resulting paste with the creosote, and mixing the creosote-containing mixture with the solution.

3. The process of making an emulsion of creosote and zinc chloride solution which consists in wetting a colloidal clay with a larger amount of water, mixing the resulting paste with an amount of creosote much greater than the clay with violent agitation, and mixing the creosote-containing mixture with the zinc chloride solution with violent agitation.

4. The process of making an emulsion of creosote and an aqueous solution of a salt which consists in agitating a clayey paste of creosote and water with a solution of the metallic salt.

5. The process of making an emulsion of creosote and zinc chloride solution which consists in agitating a clayey paste of creosote and water with a solution of zinc chloride.

6. The process of treating timber to preserve it which consists in treating it with an emulsion of creosote and a mineral salt stabilized with clay.

7. The process of treating timber to preserve it which consists in agitating a clayey paste of creosote and water with zinc chloride and impregnating timber with the resulting emulsion.

8. A treated timber having a surface impregnated to a substantial depth with zinc chloride and also impregnated from said surface to a less depth with creosote.

9. A treated timber having a surface part impregnated with creosote and a metallic salt and a metallic-salt impregnated portion extending from the surface beyond the creosote impregnated portion, and also showing clay in interstices.

ALFRED FISHER.